United States Patent [19]

Bozeman, Jr.

[11] Patent Number: 5,442,961
[45] Date of Patent: Aug. 22, 1995

[54] ACCELEROMETER HAVING INTEGRAL FAULT NULL

[75] Inventor: Richard J. Bozeman, Jr., Dickinson, Tex.

[73] Assignee: The United States of America as represented by the Administrator, National Aeronautics and Space Administration, Washington, D.C.

[21] Appl. No.: 247,151

[22] Filed: Feb. 10, 1994

Related U.S. Application Data

[62] Division of Ser. No. 834,451, Feb. 12, 1992, Pat. No. 5,309,149.

[51] Int. Cl.⁶ ............................................. G01N 29/12
[52] U.S. Cl. ........................................ 73/660; 73/658
[58] Field of Search .................. 73/593, 659, 660, 658

[56] References Cited

U.S. PATENT DOCUMENTS

| | | | |
|---|---|---|---|
| 3,979,739 | 9/1976 | Birchall | 73/660 |
| 4,366,544 | 12/1982 | Shima et al. | 73/660 |
| 4,478,082 | 10/1984 | Sato et al. | 73/593 |
| 4,481,819 | 11/1984 | Yoneyama et al. | 73/593 |
| 4,884,449 | 12/1989 | Nishimoto et al. | 73/660 |
| 4,977,395 | 12/1990 | Bozeman, Jr. | 73/658 |
| 5,001,931 | 3/1991 | Nishimoto et al. | 73/593 |

Primary Examiner—Hezron E. Williams
Assistant Examiner—Rose M. Finley
Attorney, Agent, or Firm—Hardie R. Barr; Guy M. Miller; Edward K. Fein

[57] ABSTRACT

An improved accelerometer comprising a transducer responsive to vibration in machinery which produces an electrical signal related to the magnitude and frequency of the vibration; a decoding circuit responsive to the transducer signal which produces a first fault signal, and isolating circuitry responsive to the first fault signal to produce a second fault signal in which ground shift effects are nullified.

4 Claims, 2 Drawing Sheets

ACCELEROMETER HAVING INTEGRAL FAULT NULL

This is a division of application Ser. No. 07/834,451, filed Feb. 12, 1992 now U.S. Pat. No. 5,309,149.

ORIGIN OF THE INVENTION

The invention described herein was made by an employee of the United States Government and may be manufactured and used by or for the Government of the United States of America for governmental purposes without the payment of any royalties thereon or therefor.

1. Technical Field

The present invention relates to apparatus and method for monitoring machine vibration. More particularly, the present invention is directed to an accelerometer package containing a vibration transducer with an integral and improved frequency detection circuitry having significant advantages over conventional accelerometers.

2. Background Art

Vibration analysis has been used for years to provide a determination of the proper functioning of different types of machinery, including rotating machinery and rocket engines. A determination of a malfunction, if detected at a relatively early stage in its development, will allow changes in operating mode or a sequenced shutdown of the machinery prior to a total failure. Such preventative measures result in less extensive and/or less expensive repairs, and can also prevent a sometimes catastrophic failure of equipment. In a rocket thruster, for instance, certain frequencies can be calculated as a function of the geometry of the thruster dimensions and, if detected, indicate thruster instability. If thruster vibration is monitored with respect to these critical frequencies or is detected in bands of frequencies around the critical frequencies, then it is possible to either change operating modes or provide an orderly shutdown of the thruster prior to failure. A change of operating mode for a thruster may include changing control signals to the thruster from a pulsed mode to a continuous mode signal. If such a change in operating mode is not successful to eliminate vibrations at a critical frequency, then it becomes necessary to shut down the thruster.

Accelerometers which are commercially available are contained within a package that houses only the transducer itself and may include wiring to a connector. In application, this packaging presents a number of problems. The signal wire from the accelerometer will typically go through a connector and then make its way through an electrically noisy environment before reaching a second connector, which will take the signal to a detector circuit. Noise may be picked up on this signal wire and cause false machine instability signals. Also, because the detector circuitry and accelerometer transducer may be located some distance apart and may be powered by different power supplies, ground loop errors may occur. Ground loops or ground shifts are differences between circuit grounds which may occur when circuits are powered by different power supplies, or are powered by the same power supply when the circuits are located a considerable distance apart. Relatively higher currents carried by one part of a grounding system can also result in voltage differences between other parts of a-grounding system. These voltage differences between grounds, which are often called ground shifts or ground loops, are typically variable, unknown, and insidiously cause false signals. When adding vibration monitoring and detecting circuitry it may be difficult or impossible to determine whether ground loops exist in other circuitry which may cause errors or false signals in the vibration monitoring apparatus. Similarly, noise and ground loop problems may occur when connecting an instability or fault signal wire from the detection circuitry of a vibration monitoring apparatus to a distant control circuit or computer which utilizes the fault signal to supervise a machine shut down. Typically, vibrating machinery will produce a noisy electrical environment. As well, the vibration may produce occasional changes in electrical resistance in contacts, connectors, etc. which may produce spurious machinery fault signals.

U.S. Pat. No. 4,977,395 to R. J. Bozeman discloses an adjustable delay circuit which can be used to delay the output of an instability signal until the particular type of vibration signal which denotes instability has occurred consistently enough over a period of time (e.g. 40 msec for a rocket thruster) to indicate an instability signal which is more likely to be valid. However, adding this delay circuit increases overall circuit complexity which increases the possibility of a circuit failure, and requires additional room. Also, the output of the delay circuit is itself subject to the noise and ground loop problems so that its purpose may still be defeated even if it is effective to distinguish spurious signals up to the input of the delay circuit.

Consequently, a need exists for improvements in accelerometer circuitry to provide a highly reliable means for preventing false signals from the accelerometer transducers and related circuitry operating in a vibrating, electrically harsh environment. Those skilled in the art have long sought and will appreciate the novel features of the present invention which Solves these problems.

STATEMENT OF THE INVENTION

The present invention is directed, in a preferred embodiment, to an improved accelerometer package containing not only a transducer but also the necessary frequency decoder circuitry used to provide a fault signal, thereby providing a "smart" accelerometer package. This package is designed to be powered from a single power source. The resulting packaged system may be incorporated within an accelerometer case during the original manufacturing process, or may be retrofitted into commercially available accelerometers. Conventional integrated circuits and components may be used for this purpose. Alternatively, micrologic and surface mount technology may be employed to significantly reduce the package size.

Due to the proximity of both the transducer and decoder circuitry within a single housing powered by a single power source, noise problems and ground loop problems typically found between the transducer and its related circuitry are greatly reduced to improve reliability of operation. The reduction of noise has an added benefit of reducing the necessary filtering and amplification of the transducer signal, so that components which perform these functions can be eliminated. In a preferred embodiment, the present invention allows for adjustment of the width of the band of frequencies contained in the transducer signal which will cause the decoder circuitry to produce an instability output signal. Also, it is possible to select an approximate number of pulses or cycles within the frequency band which must occur prior to the decoder circuit producing an instability output signal. This feature is available by preferably taking advantage of an inherent trait of the decoder circuit, and requires no additional circuitry. This pulse or cycle counting feature also is an effective delay which helps prevent spurious instability signals. In a preferred embodiment, the fault signal output is coupled to machinery control or a computer via optics to preclude false shutdown signals by system ground loops.

Accordingly, it is an object of the present invention to provide an integrated "smart" accelerometer package which is inherently reliable in operation in monitoring machine vibrations, regardless of unknown ground loops and electrical noise.

A feature of the present invention is the ability to vary the band width of frequencies which produce a machine instability signal.

Another feature of the present invention is the use of pulse or cycle counting to form a delay in production of the fault signal until sufficient data is received to confirm the validity of any fault signal produced.

An advantage of an integrated smart accelerometer package is a great reduction in noise and ground shift error that is associated with machinery vibration monitoring equipment.

Another advantage of an integrated smart accelerometer package with an optically isolated output is that it may be connected to other electronic equipment that may have a ground that is at a different voltage than the ground of the accelerometer package without concern of spurious signals being generated due to this difference in ground.

These and further objects, features, and advantages of the present invention will become apparent from the following detailed description, wherein reference is made to the figures in the accompanying drawings.

While the invention will be described in connection with the presently preferred embodiment, it will be understood that it is not intended to limit the invention to this embodiment. On the contrary, it is intended to cover all alternatives, modifications, and equivalents as may be included in the spirit of the invention.

DETAILED DESCRIPTION OF THE INVENTION

The present invention is directed to instable machinery vibration detection apparatus which includes not only a transducer which may be used to measure machine vibration, but also contains integral electronics which may be used to determine if a fault condition has occurred, thereby creating a "smart" accelerometer package.

Figure 1:
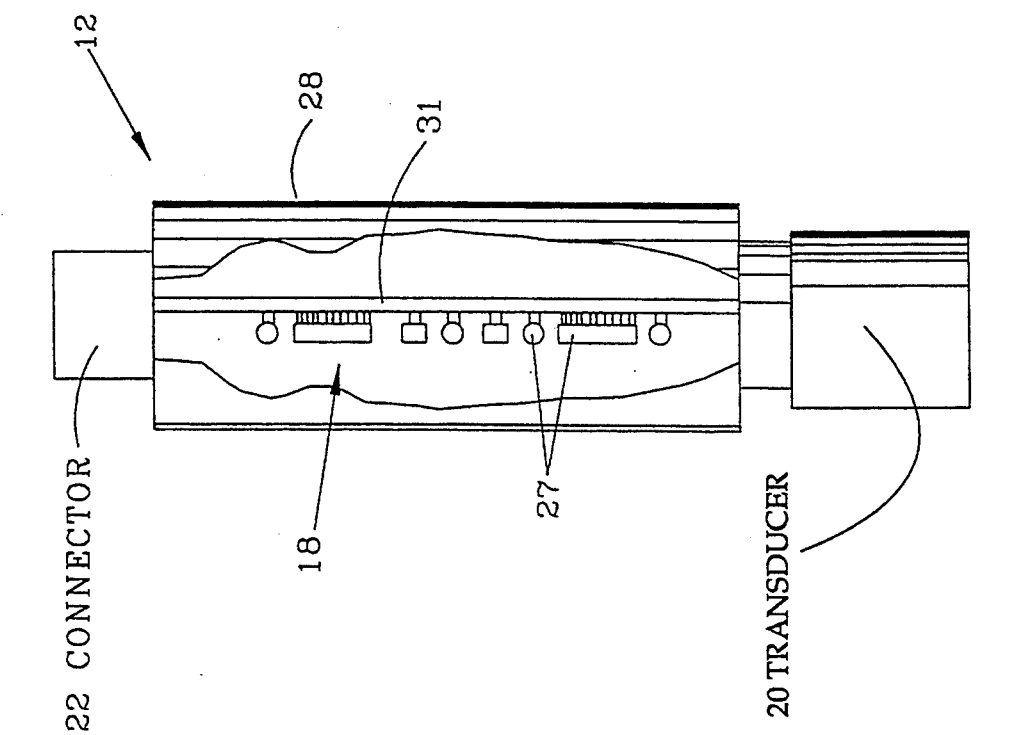
FIG. 1 is an elevational view of an accelerometer package assembled onto a thruster in accord with the present invention.
Figure 2:
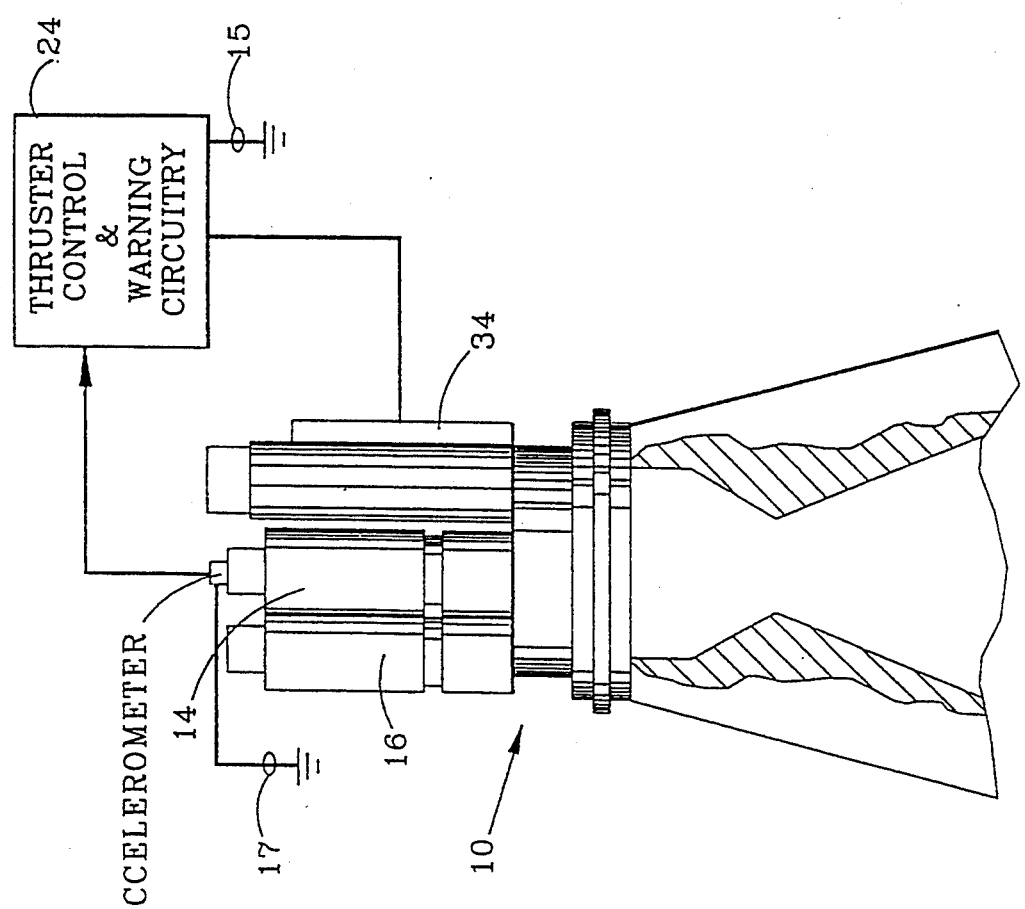
FIG. 2 is an elevational view, in section, of an accelerometer package in accord with the present invention.

An accelerometer package, designated by the numeral 12, according to a preferred embodiment of the present invention is shown in FIG. 2. An external housing 28 holds electronics circuit 18 including circuit board 31 and mounted electronic components 27 in close proximity to transducer 20. External housing 28 provides shielding from electromagnetic fields which may be in the general vicinity of the package due to radio transmitters, etc.(not shown). By enclosing all necessary components within external housing 28, the signals from transducer 20 contain less noise and have a relatively greater signal to noise ratio. This allows for a reduction in filtering and amplification circuity. Six pin connector 22 provides a ready method for electrically connecting the accelerometer package 12 to thruster control circuitry 24 (see FIG. 1).

FIG. 1 shows accelerometer package 12 mounted on rocket thruster 10 adjacent oxidizer valve 14. Related rocket thruster components including fuel valve 16 and electrical junction box 34 are also indicated in FIG. 1. Thruster control and warning circuitry 24 uses the fault signal from accelerometer package 12 to change operating modes of thruster 24 and/or to shut down thruster 10 in an orderly manner before failure. Also thruster control and warning circuitry 24 may activate an indication of failure, such as a warning light or bell (not shown). Thruster control and warning circuity 24 may include actual electronic circuitry or a software controlled computer. It is highly desirable to avoid any false or spurious indications of machine or thruster failure which may result from noise and ground loops. A ground loop, or voltage difference, may exist between ground 17 and ground 15 due to a variety of reasons, some of which may be unknown and difficult to detect during operation. These ground loops may cause a spurious indication of thruster failure and may be difficult to detect during operation of rocket thruster 10. A combination of transducer 20 and electronics circuit 18 into the same housing 28 greatly reduces the possibility of spurious signals due to ground loops and other noise which otherwise could detrimentally affect transducer 20 and related circuitry 18. Additional means for preventing spurious signals due to typically transient differences in voltage between grounds 17 and 15 are discussed subsequently.

Figure 3:
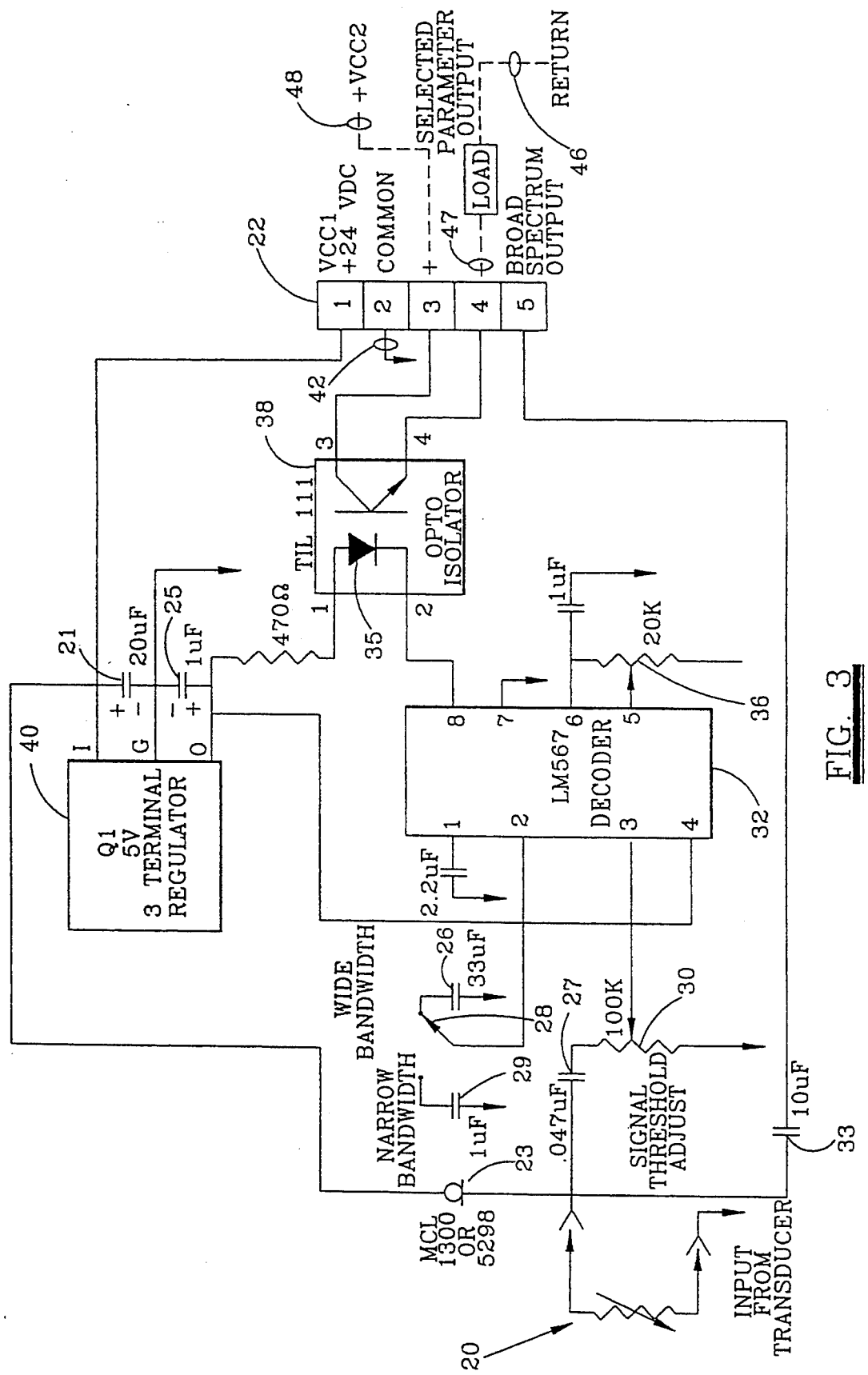
FIG. 3 is a circuit diagram of frequency decoder circuitry in accord with the present invention.

FIG. 3 provides a preferred embodiment of circuit 18 contained within accelerometer package 12. A single power source (not shown) is connected at connector 22, pin 1, with a common ground shown at pin 2. This source voltage is filtered by capacitor 21 and is used by regulator 40 to provide 5 volts at output pin O. The regulated 5 volt output is filtered by capacitor 25. Field effect diode 23 regulates current flow to transducer 20. Transducer 20 changes resistance in response to "G" forces, thus creating an electrical transducer signal which corresponds in magnitude and frequency to machine or thruster vibrations. "G" forces are generally understood to be the forces which act on a mass described by using the force of gravity as a unit force acting on a mass, e.g., two "G"s would be a force acting on a mass twice that which would occur due to gravity. Frequency adjust 38 is set for a desired center frequency selected to be equal to the expected unstable vibration frequency of the machinery or thruster to be monitored and may be calibrated by reading with a frequency counter (not shown) at pin 6 of decoder 32. A frequency band around the desired center frequency may be set using switch 28 which selects either wide bandwidth capacitor 26 for an approximately 300 hertz bandwidth or narrow bandwidth capacitor 29 for a bandwidth of approximately 75 hertz. With narrow band width capacitor 29 connected to switch 28, approximately 50 incoming cycle signals of a requisite magnitude within the frequency band are required before a fault condition is indicated at pin 8 of decoder 32. With wide bandwidth capacitor 26 connected to switch 28, approximately 10 to 15 cycles are required to generate a fault signal. These values are calculated assuming a center frequency of 1000 Hz, and will typically vary with a change in center frequency. The pulse counting feature which is inherent to preferred embodiment LM567 decoder circuit 32 prevents transient pulses within the window from generating a fault signal. By taking advantage of this inherent feature of the LM567 decoder circuit 32 which might in other circumstances be a disadvantageous characteristic, it is possible to obtain an effective delay in the circuitry without adding extra delay circuitry. The LM567 decoder circuit 32 includes a loop filter connection at pin 2 so that capacitor 26 or 29 is used to complete this loop filter. The LM567 decoder circuit 32 may also use external resistive components (not shown). A general description of the LM567 decoder is disclosed on pages 5–51 through 5–55 of the publication entitled "Semiconductor Master Selection Guide 1989" by National Semiconductor and is incorporated herein by reference.

In operation, alternating current from transducer 20, that corresponds in magnitude and frequency to machine vibration "G" forces, passes through signal capacitor 27 to signal threshold adjust 30 which determines the desired amplitude trip level based on accelerometer calibration data. For example, if a basic accelerometer produces 1 volt per "G" force and the amplitude threshold desired is 1.5 "G's", a simulated signal at the desired frequency and at 1.5 volts (typically applied with a signal generator) is fed into circuit 18, and signal threshold adjust 30 is used to set a trip level which produces an output at pin 8 of decoder 32 or pins 3 and 4 of connector 22. All adjustments described above might be set during accelerometer manufacture/calibration, and the entire package permanently encapsulated with a sealing material to minimize or eliminate effects of vibration during use. Alternatively, these calibration sequences may be determined by the user if field adjustments are desired.

A machinery fault condition results in the impedance seen at pin 8 of decoder 32 changing from a high impedance to a low impedance due to the sinking of an open collector integral to decoder 32. As a result, current flows through light emitting diode 35 between pins 1 and 2 of optical isolator 38. A resulting output then occurs at pins 3 and of optical isolator 38, which is also available at pins 3 and 4 of connector 22. A separate power supply, load, and ground connection to pins 3 and 4 of connector 22 is made through indicated wires 46, 47, and 48 which results in a circuit independent of the common circuit ground wire or land 42 connected to pin 2 of connector 22. Therefore, if return wire 46 is analogous to ground 15 of FIG. 1, if ground 42 of FIG. 3 is analogous to ground 17 of FIG. 1., and if grounds 15 and 17 of FIG. 1 are at different voltages with respect to each other, the output signal received from accelerometer package 12 by thruster control 24 will be unaffected by this voltage difference. The accelerometer package 12 and thruster control 24 circuits are thus electrically isolated from each other via optical coupling. The optical isolator 38 precludes unwarranted or inadvertent shutdown caused by electrical ground loop conditions of which an end user of accelerometer package 12 may not be aware, since the output of optical isolator 38 is independent of the ground at pin 2 of connector 22. For backup and corroboration purposes, the output of transducer 20 is also made available at pin 5 of connector 22 through direct current blocking capacitor 33.

The foregoing description of the invention has been directed in primary part to a particular, preferred embodiment in accordance with the requirements of the patent statutes and for the purposes of illustration. It will be apparent, however, to those skilled in the art that many modifications and changes in the specifically described accelerometer package 12 may be made without departing from the scope and spirit of the invention. For example, although developed for accelerometers, the teachings of this invention could be used with various types of transducers generating dynamic signals of user interest, i.e., pressure transducers, acoustic sensors, flowmeters, etc. Micro-circuitry and surface mount technology may allow control circuitry or parallel decoders operable at different frequencies to be included within accelerometer package 12. Other means for isolating the output of the package may also be used. For example, it may be possible in some situations to use differential transmission of the fault signal from accelerometer package in accordance with RS-422 or RS-485 as defined by the Electronics Industry Association (EIA) so that the effects of ground shifts and noise signals will appear as common mode voltages on the transmission line and thereby be nullified. If it is desired to have a latched output condition upon fault detection rather than a pulse, an optical silicon controlled rectifier (SCR) may be used, and could be reset by an external reset switch or by dropping the load. It may be desirable for some applications to have an output pulse of a fixed time duration so that circuitry may be added to produce a pulse having a fixed time duration in response to a variable width fault pulse signal. Therefore, the invention is not restricted to the preferred embodiment illustrated, but covers all modifications which may fall within the scope of the spirit of the invention.

What is claimed is:

1. A machinery vibration monitoring apparatus, comprising:

a transducer responsive to vibration in machinery operative to produce an electrical transducer signal functionally related to the magnitude and frequency of said vibration;

a decoding circuit responsive to said electrical transducer signal greater than a predetermined magnitude within a selected frequency band to produce a first fault signal after a predetermined approximate number of cycles have occurred of said electrical transducer signal within said frequency band; and isolating circuitry responsive to said first fault signal to produce a second fault signal in which ground shift effects are nullified.

2. The apparatus of claim 1, wherein:

said isolating circuitry includes optical isolation circuitry.

3. The apparatus of claim 1, further comprising:

a means for adjusting the width of said frequency band.

4. The apparatus of claim 1, further comprising:

a means for adjusting said predetermined approximate number of cycles of said electrical transducer signal within said frequency band.

* * * * *